United States Patent [19]
Hilbert

[11] 3,812,525
[45] May 21, 1974

[54] DYNAMIC PEAKING SYSTEM

[75] Inventor: Francis H. Hilbert, Addison, Ill.

[73] Assignee: Motorola Inc., Franklin Park, Ill.

[22] Filed: June 22, 1972

[21] Appl. No.: 265,377

[52] U.S. Cl. ........ 358/38, 178/DIG. 28, 333/18 R, 358/7

[51] Int. Cl. .......................... H04n 9/00, H03g 1/00

[58] Field of Search .... 178/5.2 D, 5.4 AC, DIG. 28; 325/42, 65; 333/18 R, 18 T

[56] References Cited

UNITED STATES PATENTS 3,604,844 9/1971 Ross ............................. 178/5.4 AC
2,798,900 7/1957 Bradley ......................... 178/5.4 AC

FOREIGN PATENTS OR APPLICATIONS 693,885 9/1964 Canada ................................ 325/65

*Primary Examiner*—Robert L. Griffin
*Assistant Examiner*—George G. Stellar
*Attorney, Agent, or Firm*—Eugene A. Parsons; Vincent J. Rauner

[57] ABSTRACT

A color television recording system is shown wherein trains of pulses are produced by a CRT sweeping recorded color information on a film. Each train of pulses is preceded by several pulses representative of a low frequency of the system and several pulses representative of a high frequency of the system. The two groups of pulses are separated and detected to provide DC signals which are compared to produce a difference signal. The difference signal is utilized to peak an amplifier in the recording system so that the frequency response of the system is at a predetermined ratio for the high and low frequencies.

5 Claims, 4 Drawing Figures

DYNAMIC PEAKING SYSTEM

BACKGROUND OF THE INVENTION

1. Field of the Invention

The present system is useful in any apparatus wherein trains of pulses are provided to convey information, such as television and television recording apparatus, for example the recording apparatus described in the copending application entitled "Color Signal Recording and Decoding," filed Dec. 20, 1971, Ser. No. Decoding," 210,098 and assigned to the same assignee now Pat. No. 3,730,976, issued May 1, 1973. While the present invention will be described in conjunction with apparatus generally similar to that described in the above described application, it will be apparent to those skilled in the art that there are many other applications for the system.

In apparatus, such as television and television recording apparatus, trains of pulses are produced by sweeping films or actual objects with cathode ray tubes (CRT) and processing the trains of pulses to transmit or otherwise apply them to additional or following apparatus. Because of finite spot size, defocusing, and many other physical and electrical phenomena the pulses produced are not square pulses, as desired, but may vary substantially in appearance, including height, width, or other characteristics. These variations are especially noticeable as the frequencies vary and, for example, may in many instances affect the low frequencies little or not at all while rendering the high frequencies practically useless.

2. Description of the Prior Art

Prior art apparatus, in an effort to compensate for the discrepancies described above, generally adjust the various physical apparatus, such as focusing, spot size, etc., to a desired level or optimum condition and then permanently design amplifiers and other following electronic circuits with a frequency response such that the pulses produced are as close to square waves as possible. This method is undesirable because physical and electrical components of the apparatus vary with age, use and ambient conditions. The apparatus must be periodically adjusted back to the optimum conditions so that the circuitry will produce optimum shaped pulses. Because any change in ambient conditions or physical movement may alter the apparatus, it is clear that this method of compensation is unsatisfactory.

SUMMARY OF THE INVENTION

The present invention pertains to a dynamic peaking system for pulse processing apparatus wherein means receive a first plurality of pulses representative of a low frequency and provide an output signal and second means receive a second plurality of pulses representative of a high frequency and provide an output signal, which two output signals are compared to provide an output signal representative of the difference therebetween and the output signal is utilized to dynamically peak at least one circuit in the pulse processing apparatus to adjust the frequency response thereof and render the magnitudes of the high frequency and low frequency pulses approximately equal.

It is an object of the present invention to provide a dynamic peaking system for pulse processing apparatus.

It is a further object of the present invention to provide a system which continually monitors high and low frequency pulses and adjusts the frequency response of circuitry receiving the pulses so that the magnitudes of the pulses are in a predetermined ratio.

It is a further object of the present invention to provide, in pulse processing apparatus adapted to receive sequential trains of pulses, pulses representative of high and low frequencies for said apparatus adjacent one end of each of the trains of pulses within said apparatus for use in a dynamic peaking system.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

BRIEF DESCRIPTION OF THE PREFERRED EMBODIMENT

Figure 1:
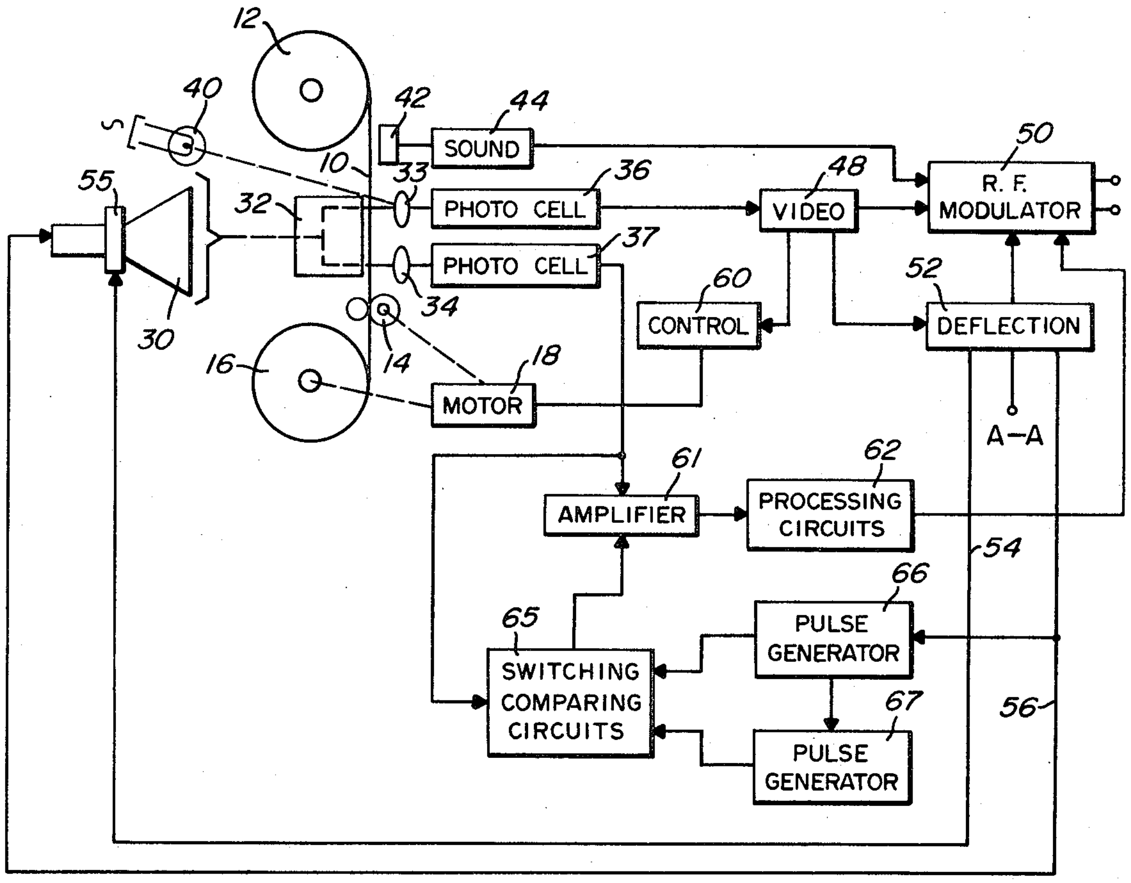
FIG. 1 is a block diagram of a portion of color recording apparatus with an embodiment of a dynamic peaking system incorporated therein.

The apparatus of FIG. 1 functions to derive from a record medium signals representing image brightness information, signals representing color information, and signals representing accompanying sound. The brightness, color and sound information signals are shown as applied to a modulator to form a multiplex modulated carrier signal which is tunable on one channel of a standard television receiver. In the present embodiment the record medium is photographic film 10, which is drawn from a supply reel 12 by a capstan 14 and wound on a take-up reel 16. A motor 18 drives the capstan 14 and the take-up reel 16.

Figure 2:
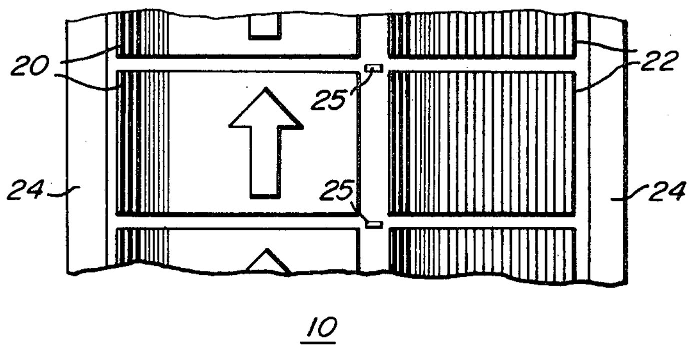
FIG. 2 is a representation of a segment of photographic film having color information and high and low frequency pulse information recorded thereon.

FIG. 2 illustrates a segment of the photographic film 10 which includes brightness image frames 20 and color coded frames 22 in side by side relation along the length of the film 10. Sound tracks 24 extend along opposite edges of the film for magnetic recording of stereophonic sound information, or for providing two different sets of sound information alternately usable with the images. In the central area of the film 10 between the image areas 20 and 22 there are synchronizing windows 25 which may be, for example, clear areas of the film in an otherwise opaque region so that frame scanning of the image areas can be synchronized.

It will be recognized that the representation of the film scanning apparatus of FIG. 1 is illustrated for clarity as longitudinally displaced whereas actually the scanning apparatus should be laterally displaced for scanning of the side by side frames 20 and 22 of the film of FIG. 2. A raster is generated by a cathode ray tube 30 and projected through an optical image splitter 32 so that the same raster image is projected through each of the frames 20 and 22 of the film 10. Associated lenses 33 and 34 focus the raster images on a pair of photo cells 36 and 37, the photo cell 36 providing a signal representing the video information of the brightness frame 20 and the photo cell 37 providing the electrical signal corresponding to variations in the opaqueness of the color coded image areas 22.

A lamp 40 is energized to provide illumination which can be optically conducted to the region through which the synchronizing windows 25 (FIG. 2) pass in order to periodically generate a signal in the photo cell 36 representing frame scanning information. A magnetic pickup head 42 scans the sound tracks 24 and is coupled to sound circuitry 44 to develop audio signals represented in the film 10.

The brightness frames 20 are illustrated as simply the image of an arrow. These frames may be in the form of a series of black and white transparencies with the series depicting various stages of motion as is common in motion picture photography. The frames 20 modulate the light from the raster of the tube 30 to produce a series of horizontal scanning cycles or trains of video information which is translated from the photo cell 36 to a video amplifier 48. The signal is then translated to an RF modulator 50 for modulation of a suitable carrier wave to be developed at the output terminals thereof for application to the tuner of a television receiver. Each frame 20 also includes a series of transparent and opaque lines along the left edge thereof, which lines produce a first series of pulses representative of a low frequency for the apparatus and a second series of pulses representative of a high frequency for the apparatus. The two series of pulses precede each train of horizontal information produced by each horizontal scan in the raster of the tube 30.

A portion of the output information of the video amplifier 48 will also include vertical scanning pulses from the light of lamp 40 passing through the synchronizing windows 25. Such pulses are coupled to a deflection system 52. System 52 provides horizontal and vertical sweep signals by way of lead 54 to a deflection yoke 55 on the cathode ray tube 30. The system operates to scan a new one of the brightness frames 20 in response to a pulse produced by each sync window 25 and the scanning of each frame may take place, for example, at standard television horizontal deflection rates. The deflection system 52 also provides a blanking pulse during horizontal retrace over a lead 56 which is applied to the cathode grid circuit of the tube 30 for blanking the raster during retrace. It is also appropriate to couple sweep control signals from the deflection circuit 52 to the modulator 50 so that suitable vertical and horizontal deflection control pulses may be incorporated in the output of the modulator 50. It is also necessary to control the speed of the motor 18 so that the film 10 is driven in synchronism with vertical scanning in the picture tube 30. Accordingly, a control circuit 60 is coupled to the video amplifier 48 to be responsive to signals developed by the sync windows 25.

Each of the color coded frames 22 comprises longitudinally extending clear and opaque stripes or record level changes. The stripes at the left end of each frame correspond generally with the stripes at the left end of each of the frames 20 and produce two series of pulses representative of a low frequency for the system and a high frequency for the system, respectively. The remaining lines provide coded color information which is applied through an amplifier 61 to processing circuits 62 which supply to the RF modulator 50 a quadrature modulated sub-carrier carrying the multiplex information of two color difference signals reproducible by the usual color television receiver. The processing circuits 62 are not described in detail herein since they do not form a portion of this invention, but the operation thereof is described in the application set forth above. A blanking pulse applied to the modulator 50 from the deflection circuits 52 is wider than the blanking pulse available on the lead 56 so that the frequency representative pulses produced by the lines at the left of the frames 20 and 22 do not appear in the output of the modulator 50.

In the apparatus illustrated in FIG. 1, peaking circuitry is utilized to operate only on the sequential trains of pulses from the photo cell 37 but it should be understood that similar circuitry might be utilized on the sequential trains of pulses from the photo cell 36. The trains of pulses from the photo cell 37 are applied to switching and comparing circuits 65 and the output therefrom is applied to peaking circuits within the amplifier 61 for adjusting the frequency response of the amplifier 61 to render the magnitudes of the first and second series of pulses preceding each train of information, representative of low and high frequencies respectively, approximately equal. The narrow blanking pulse is obtained from the lead 56 and applied to a pulse generating circuit 66. The pulse generating circuit 66 is triggered by the blanking pulse and applies a pulse, illustrated in FIG. *4c*, to the switching and comparing circuits 65 and to a second pulse generating circuit 67. The second pulse generating circuit 67 is controlled by the pulse from the first pulse generating circuit 66 and provides a second pulse, illustrated in FIG.*4d*, to the switching and comparing circuit 65. The pulses or gates from the pulse generators 66 and 67 are utilized in the switching and comparing circuits 65 to separate the first and second series of pulses, representative of high and low frequencies respectively, applied to the switching and comparing circuits 65 and to prevent the application of any of the remaining information from the photo cell 37.

Figure 3:
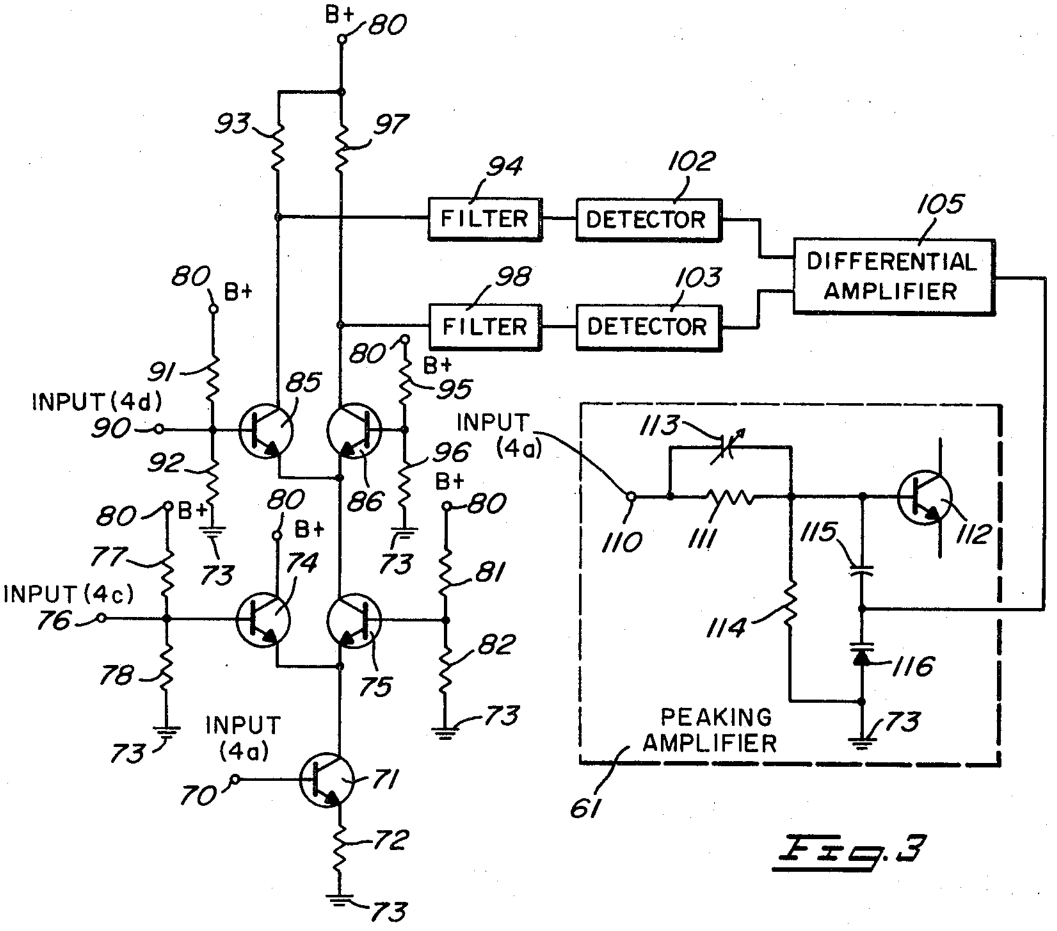
FIG. 3 is a more detailed schematic-block diagram of a switching and comparing circuit of the apparatus illustrated in FIG. 1; and FIG. *4a–4d* is a series of amplitude versus time waveforms present in the circuitry of FIG. 3.

An embodiment of switching and comparing circuits 65 is illustrated in detail in FIG. 3. The sequential trains of pulses from the photo cell 37 are applied to an input terminal 70, which is connected to the base of an NPN type transistor 71. The emitter of the transistor 71 is connected through a resistor 72 to a common or ground point 73. The collector of the transistor 71 is connected to common connected emitters of a pair of transistors 74 and 75. The base of the transistor 74 is connected to a terminal 76 connected to receive the output signal from the pulse generator 66 and is further connected to a junction point between a pair of resistors 77 and 78, which are connected as a voltage divider between ground 73 and a suitable source of voltage 80. The collector of the transistor 74 is connected directly to the voltage source 80. The base of the transistor 75 is connected to the junction between a pair of resistors 81 and 82 connected as a voltage divider between the source of voltage 80 and ground 73. The collector of the transistor 75 is connected to common connected emitters of a pair of transistors 85 and 86. The base of the transistor 85 is connected to a terminal 90, which is connected to receive the output of the pulse generator 67, and to the junction between a pair of resistors 91 and 92 connected as a voltage divider between the voltage source 80 and the ground 73. The collector of the transistor 85 is connected through a resistor 93 to the voltage source 80 and provides a first output signal to a filter 94. The base of the transistor 86 is connected to the junction between a pair of resistors 95 and 96 connected as a voltage divider between the voltage source 80 and ground 73. The collector of the transistor 86 is connected through a resistor 97 to the source of voltage 80 and supplies a second output signal to a filter 98.

Figure 4:
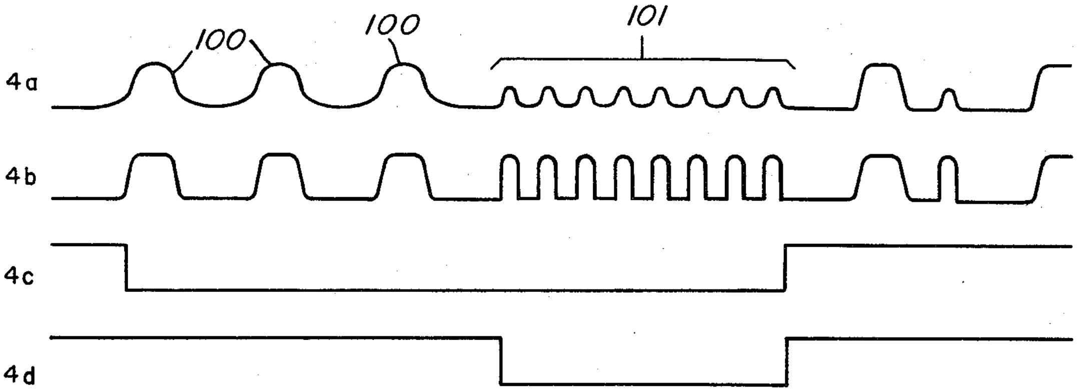

FIG. 4*a* illustrates a train of pulses representative of typical signals from the photo cell 37. FIG. 4*b* illustrates the train of pulses illustrated in FIG. 4*a* after peaking has been performed thereon in amplifier 61. FIG. 4*c* illustrates a typical gate supplied by the pulse generator 66 to the terminal 76. FIG. 4*d* illustrates a typical gate supplied by the pulse generator 67 to the terminal 90. Each of the signals in 4*a–d* are illustrated in time sequence relative to each other. The first series of pulses, designated 100 in FIG. 4*a*, is representative of a low frequency for the apparatus illustrated in FIG. 1 and the second series of pulses, designated 101 in FIG. 4*a*, is representative of a high frequency for the apparatus illustrated in FIG. 1. The remaining pulses represent the color coding information conveyed by the frames 22 in the film 10.

The transistors 74 and 75 in the schematic of FIG. 3 are biased so that the transistor 74 is normally conducting and the transistor 75 is normally cut off. When the gate from the pulse generator 66 is applied to the terminal 76, the negative going gate causes the transistor 74 to be cut off and, therefore, allows the transistor 75 to conduct. With transistor 75 conducting the train of pulses applied to the input terminal 70 pass through the transistor 75 to the pair of transistors 85 and 86. Since the gate from the pulse generator 66 is only as wide as the first and second series of pulses 100 and 101, respectively, only these pulses are allowed to pass through the transistors 71 and 75 and the remaining information is eliminated therefrom. The transistors 85 and 86 are biased so that the transistor 85 is normally conducting and the transistor 86 is normally cut off. Therefore, the first series of pulses 100 pass through the transistor 85 and appear at the collector thereof where they are applied to the filter 94. As can be seen from FIG. 4, prior to the application of the second series of pulses 101 the pulse generator 67 applies a gate to the input terminal 90 which cuts off the transistor 85 and allows the transistor 86 to conduct. Therefore, the second series of pulses 101 pass through the transistor 86 and appear at the collector thereof where they are applied to the filter 98. Thus, the circuitry described separates the first and second series of pulses 100 and 101 from each other and from the remaining information in each of the trains of pulses.

The first train of pulses 100 is applied through the filter 94 to a detector 102 which provides a DC signal at the output thereof representative of the magnitude of the first series of pulses 100. The second series of pulses 101 are applied through the filter 98 to a detector 103, which provides a DC signal at the output thereof representative of the magnitude of the second series of pulses 101. While detectors are utilized in the present embodiment to provide a DC signal representative of the amplitude of the pulses, it should be understood that other circuitry might be utilized to provide a signal representative of other characteristics of the pulses, such as energy content, width, etc., and it is intended that the term "magnitude" encompass all of these various characteristics. The detector 102 delays the DC output signal so that the DC signal from the detector 102 and the DC signal from the detector 103 are applied to a differential amplifier 105 together for comparison therein. The differential amplifier 105 provides a difference signal at the output thereof which is, in this embodiment, a DC signal. The DC difference signal is applied to a peaking circuit in the amplifier 61, one embodiment of which is illustrated schematically in FIG. 3 within the dotted block labelled 61.

Referring to FIG. 3, an input terminal 110, connected to receive the pulse trains from the photo cell 37, is connected through a resistor 111 to the base of a transistor 112. A variable capacitor 113 is connected in parallel with the resistor 111. A resistor 114 is connected from the base of the transistor 112 to common or ground 73. A capacitor 115 and a varactor 116 (a voltage sensitive capacitor) are connected in series between the base of the transistor 112 and ground 73. The DC difference signal from the differential amplifier 105 is connected to the junction of the capacitor 115 and the varactor 116. The remaining connections of the transistor 112 and any additional circuitry in the amplifier 61 are not illustrated in detail herein because this remaining circuitry is well known to those skilled in the art and does not form a portion of this invention.

In the peaking circuit illustrated, capacitors 113 and 115 and varactor 116 form a relatively high impedance voltage divider for low frequency input signals and a relatively low impedance voltage divider for high frequency input signals. The resistors 111 and 114 form a relatively low impedance voltage divider for low frequency input signals and a relatively high impedance for high frequency input signals. The DC difference signal from the differential amplifier 105 is applied to the varactor 116 and adjusts the capacitance thereof in accordance with the magnitude of the signal. As the capacitance of the varactor 116 is adjusted in accordance with the magnitude of the DC signal from the differential amplifier 105, the high frequency portion of the voltage divider has more or less effect on the transistor 112 and, therefore, adjusts the frequency response of the amplifier 61 to render the magnitudes of the first and second series of pulses approximately equal. For example, in the circuitry of FIG. 3 with the pulses of FIG. 4*a* applied to the input terminal 70, the difference in magnitudes between the first and second series of pulses 100 and 101 is relatively large and a relatively large DC signal will be applied from the output of the differential amplifier 105 across the varactor 116. This relatively large DC voltage applied across the varactor 116 decreases the capacitance thereof and increases the impedance to high frequencies in the leg of the voltage divider between the base of the transistor 112 and ground 73. Increasing the impedance in this leg of the voltage divider increases the amount of signal applied to the transistor 112 and increases the response of the amplifier 61 to higher frequencies. While the present peaking circuit is designed so that the DC difference voltage adjusts the high frequency portion of the circuit, it should be understood that circuits might be utilized wherein the low frequency or the entire band is adjusted in response to the difference signal.

Thus, a dynamic peaking system is disclosed wherein high and low frequency pulses are applied to determine the response of the apparatus to the various frequencies and some portion of the apparatus is adjusted to alter the frequency response so that the magnitudes of the high and low frequency pulses are adjusted to a predetermined ratio. Because the peaking system is a dynamic system which varies with any variations in the apparatus, the necessity for periodic manual adjustments is substantially eliminated and the operation of the apparatus is improved. While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. Improved pulse processing apparatus comprising:

a. means, including a recording medium and a scanning system for converting information recorded on said medium to a plurality of trains of pulses, each train having adjacent an end thereof a first plurality of pulses representative of a high frequency for the apparatus and a second plurality of pulses representative of a low frequency for the apparatus;
b. first and second means for providing DC signals representative of the magnitude of pulses applied thereto;
c. switching means coupling said first and second means to said pulse producing means for applying only the first plurality of pulses in each train to said first means and only the second plurality of pulses in each train to said second means;
d. comparing means coupled to said first and second means to receive the signals therefrom and provide an output signal representative of the difference therebetween; and
e. adjustable amplifying means coupled to said pulse producing means for amplifying the trains of pulses and further coupled to said comparing means for adjusting the frequency response thereof in response to the output signal of said comparing means to render the magnitudes of the first and second pluralities of pulses in a predetermined ratio.

2. Improved pulse processing apparatus as set forth in claim 1 wherein the pulse producing means includes a light source, apparatus for receiving film and a photo cell.

3. Improved pulse processing apparatus as set forth in claim 2 wherein the light source includes a cathode ray tube with circuitry for providing a raster thereon.

4. Improved pulse processing apparatus as set forth in claim 3 wherein each horizontal sweep in the raster provides one of the train of pulses and the horizontal sweeps are separated by blanking pulses.

5. Improved pulse processing apparatus as set forth in claim 4 wherein the switching means are coupled to receive the blanking pulses for sequencing said switching means to pass only the desired plurality of pulses through each of the predetermined first and second means.

* * * * *